United States Patent [19]
Vojta et al.

[11] Patent Number: 5,497,936
[45] Date of Patent: Mar. 12, 1996

[54] METHOD AND APPARATUS FOR SOLDERING A COIL WINDING WIRE TO A TERMINAL PIN

[75] Inventors: Erich Vojta, Hemhofen; Horst Hendel, Berlin, both of Germany

[73] Assignee: Siemens Aktiengesellschaft, Munich, Germany

[21] Appl. No.: 327,208

[22] Filed: Oct. 21, 1994

[30] Foreign Application Priority Data

Oct. 21, 1993 [DE] Germany .......................... 43 36 000.9

[51] Int. Cl.⁶ .................................................... H05K 3/34
[52] U.S. Cl. .................... 228/173.5; 228/179.1; 228/253; 228/259; 29/860
[58] Field of Search .............. 228/173.5, 179.1, 228/253, 255, 259; 29/843, 857, 860; 219/85.13, 85.22

[56] References Cited

U.S. PATENT DOCUMENTS

| | | | |
|---|---|---|---|
| 3,834,015 | 9/1974 | DiRenzo | 228/179.1 |
| 4,039,801 | 8/1977 | Foerster et al. | 219/137 R |
| 4,471,160 | 9/1984 | Arthur | 29/860 |

FOREIGN PATENT DOCUMENTS

| | | |
|---|---|---|
| 0138072 | 4/1985 | European Pat. Off. . |
| 2287121 | 4/1976 | France . |
| 1949413 | 4/1971 | Germany . |
| 2063535 | 6/1972 | Germany . |
| 2106665 | 9/1972 | Germany . |
| 2301094 | 11/1974 | Germany . |
| 2739418 | 3/1979 | Germany . |
| 3036197 | 4/1992 | Germany . |
| 1521074 | 8/1978 | United Kingdom . |
| WO92/22103 | 12/1992 | WIPO . |

OTHER PUBLICATIONS

*Patent Abstracts of Japan*, vol. 10, No. 297 (E–444) (2353), Oct. 9, 1986.
*Patent Abstracts of Japan*, vol. 10, No. 379 (E–465) (2436), Dec. 18, 1986.

*Primary Examiner*—Samuel M. Heinrich
*Attorney, Agent, or Firm*—Hill, Steadman & Simpson

[57] ABSTRACT

A method is provided for soldering a coil winding to a terminal pin. A specific quantity of solder is applied onto the terminal pin, the terminal pin having a winding end wrapped therearound. The solder, for example, can be applied by immersing the pin end into a solder bath having a temperature only slightly above the melting point of the solder. Subsequently, the solder is melted with a welding torch under a protective atmosphere only at a power and time required to achieve a soft-soldering temperature. As a result thereof, a soldering free of fluxing agent and without the high thermal stress of a welding is possible. Other embodiments include placing a ring of solder onto the terminal prior to heating. Also, a predetermined length of solder wire can be brought into contact with the terminal pin prior to heating. The invention provides a guide tube device for such a purpose.

18 Claims, 4 Drawing Sheets

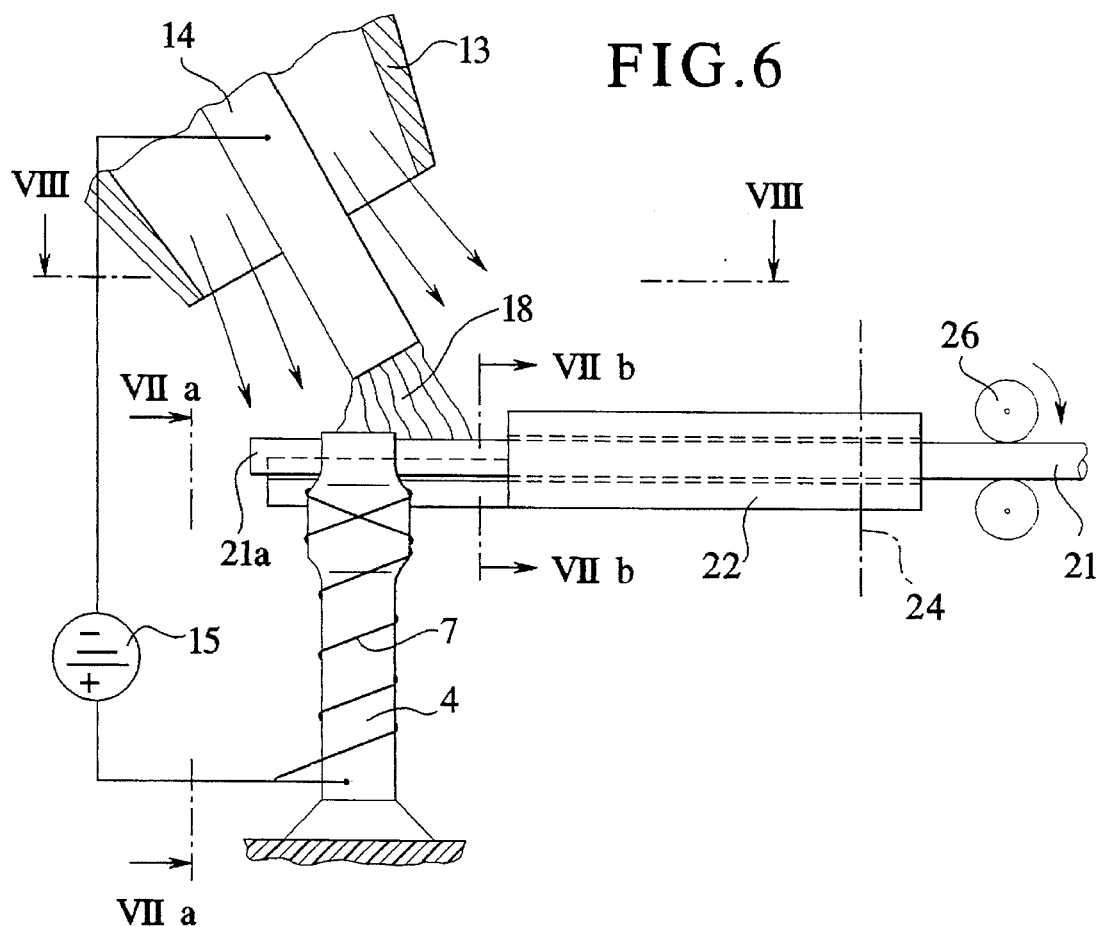
FIG.6
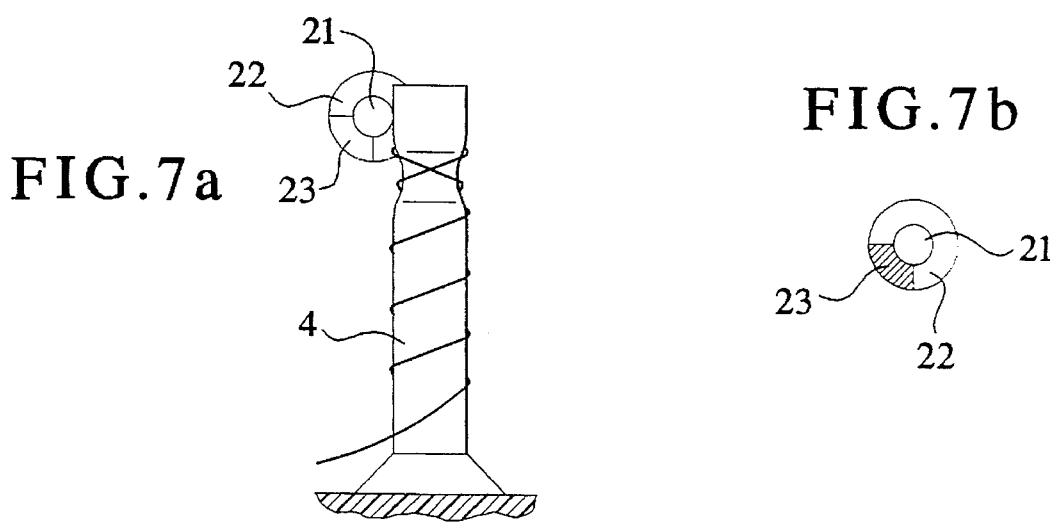
FIG.7a
FIG.7b

METHOD AND APPARATUS FOR SOLDERING A COIL WINDING WIRE TO A TERMINAL PIN

BACKGROUND OF THE INVENTION

The present invention generally relates to soldering. More specifically, the present invention relates to soldering a wire to a terminal pin with a noncontacting heat source.

It is generally known to contact the terminal pins to the winding ends of coils, e.g., relay coils, by immersion of the pins respectively wound with the winding ends in a solder bath. However, with this method, a fluxing agent is required in order to assure reliable soldering.

Unfortunately, fluxing agents and solder baths release toxic vapors. Furthermore, fluxing agent residues can damage neighboring contact surfaces. In the relay, for instance, such damage can cause an outage of the relay during later operation. Moreover, traditional solder baths have operating temperatures of approximately 350° C. and are, therefore, subject to pronounced scaling of their surface resulting in great quantities of waste solder.

In an effort to eliminate the need for undesirable fluxing agents, it is known to fuse winding ends to respective terminal pins with are welding under a protective atmosphere (hereinafter referred to as "TIG" welding). Such a method is disclosed in German published application 2 063 535. Under certain circumstances, however, the high welding temperatures subject the associated coil to an excessively high thermal load.

Also, U.S. Pat. No. 4,039,801 (which claims priority based on German published application 2 301 094) relates to the use of a pre-tinplated terminal pin in a process of arc welding a section of wound wire thereto. A layer of solder is provided on the pin. The solder, however, is used to position the wire. The permanent contacting is the result of welding at a high welding temperature.

Therefore, a need exists for an improved method of soldering a winding end to a terminal pin without the use of a fluxing agent. Furthermore, a need exists for such a method which avoids high welding temperatures with the corresponding thermal load.

SUMMARY OF THE INVENTION

The present invention provides a method for soldering terminal pins to coil winding ends which does not require the undesirable use of fluxing agents. Furthermore, the present invention provides a method for soldering which does not subject the associated coil to excessively high thermal loads. To this end, in an embodiment, a method for soldering is provided including: wrapping a winding wire around a terminal pin; contacting the terminal pin with an amount of solder free of fluxing agents; and melting the solder at soldering temperature under a protective atmosphere by a heat source.

In the method of the invention, thus, the solder is separately supplied and is then melted over the winding wire wound onto the terminal pin. The employment of a fluxing agent is avoided due to the protective atmosphere. The heat source can be a device used for traditional welding. However, according to the present invention, only a soldering temperature is reached at the terminal pin, for example, 300°–400° C.

In a preferred embodiment, heat is applied with an arc under a protective atmosphere (TIG arc). The activation time of the arc is dependent on the thicknesses of the materials employed. For example, for a standard terminal pins having a diameter of 0.6 mm, an arc activation time of a approximately 100–200 msec is adequate given an arc current of approximately of 2 Amperes. Because the arc power is low and short arc time, temperatures are lower than those reached during traditional welding. This results in lower thermal loads on the metal wire coil windings and the coil base, which can be plastic.

In an embodiment, the heat source is a laser which directs a laser beam onto the terminal pin and soldering area.

According to the present invention, the solder can be supplied in various ways after the wrapping of the winding wire. In an embodiment, the pin tips are briefly immersed into a solder bath whose temperature lies only slightly above the melting point of the solder. Practically no scaling occurs given such a low temperature of the solder bath.

The pins are dipped only slightly into the bath; the wrapped winding end is also not soldered during immersion. As a result, an sufficient quantity of solder adheres to each immersed terminal pin end by cooling in the form of a drop. When the heat is applied, this amount of solder flows in a bulbous mass over the region of the wrapped wire.

In another embodiment, the predetermined quantity of solder is provided in ring shape. Such a ring can be cut from a tubular piece. The ring is placed onto the free end of the terminal pin. This solder ring can subsequently be melted by application of a heat source under a protective atmosphere, as set forth above.

In another embodiment, the solder is provided in the form of a wire. A respective end section of the solder wire is brought into contact with the terminal pin and is then melted off.

In a related embodiment, the solder wire can be supplied via a special device which provides the solder wire within a guide tube. The device advances an appropriate predetermined end length of the solder wire which is brought into contact with the terminal pin. The guide tube can have an extension that supports a side of the solder wire end section, but openly exposes the solder wire to the terminal pin and the heat source.

Therefore, it is an advantage of the present invention to provide an improved method of soldering a winding wire to a terminal pin.

Another advantage of the present invention is to provide a method of soldering which does not generate high levels of heat.

A further advantage of the present invention is to provide a method of soldering which avoids subjecting a coil to excessively high thermal loads.

Still another advantage of the present invention is to provide method of soldering wherein plastic of a coil base is only slightly stressed in comparison to a traditional welding process.

Moreover, an advantage of the present invention is to provide a method of soldering wherein the electrode wear is also low in comparison to known welding methods.

A still further advantage of the present invention is to provide a method of soldering which avoids the use of a fluxing agent.

Yet another advantage of the present invention is to provide an improved device for supplying, advancing and contacting a predetermined length of solder wire against a terminal pin.

BRIEF DESCRIPTION OF THE DRAWINGS

FIG. 6 is a schematic illustration of a TIG soldering arrangement wherein a solder wire is supplied through a guide tube according to an embodiment of the present invention.

FIG. 7a is a sectional view taken generally along line VIIa—VIIa of FIG. 6.

FIG. 7b is a sectional view taken generally along line VIIIb—VIIIb of FIG. 6.

DETAILED DESCRIPTION OF THE PRESENTLY PREFERRED EMBODIMENTS

Figure 1:
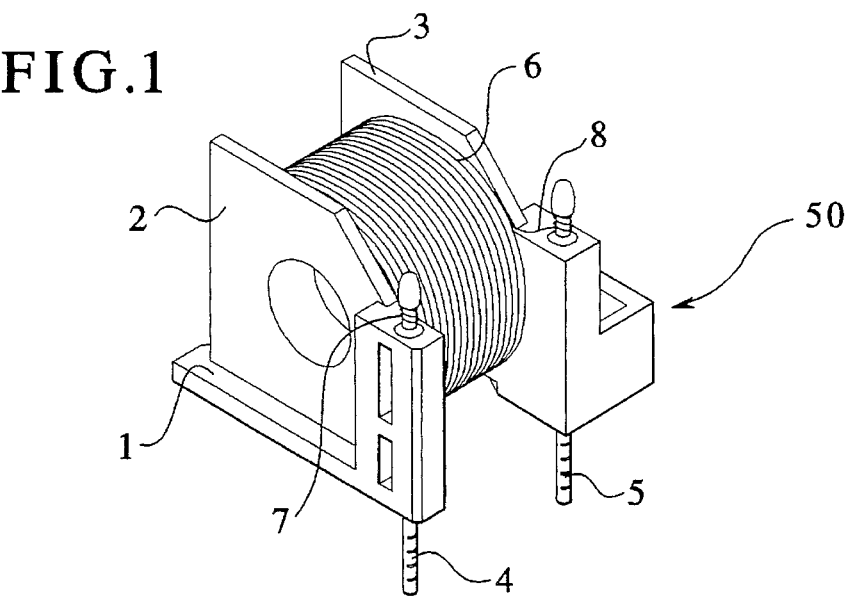
FIG. 1 is a perspective view of a relay coil which can be soldered by the method of the present invention.

In accordance with the invention described wherein like numerals designate like parts, FIG. 1 shows a relay coil 50 as an example of a type of relay coil with which the method of the invention can be applied. The coil 50 has a base 1 having two flanges 2 and 3. The base 1 can be plastic. The flanges 2 and 3 each have a respective terminal pin 4 and 5 anchored therein. The coil member 50 has a winding 6 in a spooled manner between the flanges 2, 3. A first winding end 7 of the winding 6 is wrapped and soldered to the upper end of the terminal pin 4. Similarly, the winding 6 has a second winding end 8 wrapped and soldered to an upper end of the terminal pin 5.

Figure 2:
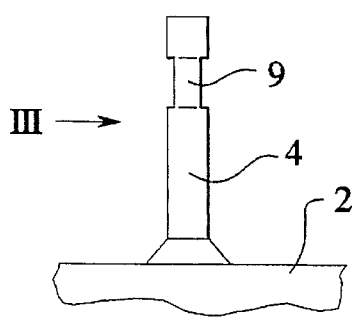
FIG. 2 is an elevated front view of a terminal pin on the coil of FIG. 1.
Figure 3:
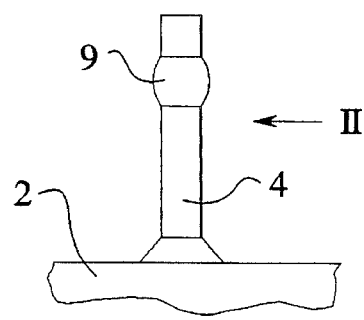
FIG. 3 is an elevated side view of the terminal pin of FIG. 2.

Referring to FIGS. 2 and 3, the end section of the terminal pin 4 is shown anchored in the flange 2. The terminal pin 4 is generally cylindrical, but is partially crimped to form a flat zone 9. The terminal pin 5 is similarly shaped.

Figure 4A:
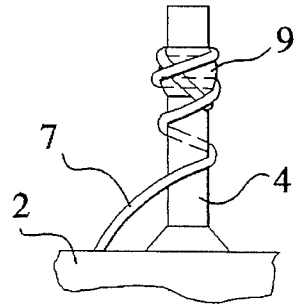
FIG. 4a is an elevated side view of the terminal pin of FIG. 3 having a winding end wrapped therearound.
Figure 4B:
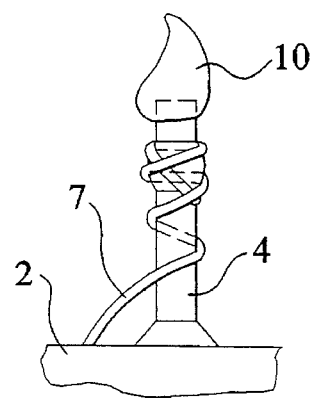
FIG. 4b is an elevated side view of the terminal pin of FIG. 4a wherein a tip of the terminal pin has a drop of soft solder applied thereon according to a method of the invention.
Figure 4C:
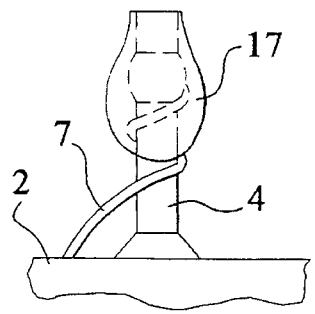
FIG. 4c is an elevated side view of the terminal pin of FIG. 4b where the solder drop has been melted to flow over the wrapped winding end.

FIGS. 4a, 4b and 4c show different phases during contacting between the terminal pin 4 and winding end 7. In FIG. 4a, the winding end 7 is wrapped around the terminal pin 4, particularly around the flat zone 9, with a few turns.

The winding end 7 is preferably wrapped in a manner whereby it remains anchored firmly in position and does not undo by itself. Next, as shown in FIG. 4b, a soft solder drop 10 of a specific predetermined quantity is then brought into contact with the terminal pin 4. Application of the drop 10 occurs according to an immersion operation illustrated in FIG. 5b, so that the supplied quantity of solder remains adhering to the free end of the terminal pin 4 as the solder drop 10.

The soft solder drop 10 is then heated to soldering temperature, i.e., to approximately 300°–400° C., with a welding system under a protective atmosphere. When heated, the solder drop 10 melts and flows over the region of the wrapped winding end 7. The solder cools and solidifies forming a bulb 17, as shown in FIG. 4c. The insulating lacquer of the winding end 7 melts off during heating, so that the winding wire 6 is reliably mechanically and electrically connected to the terminal pin 4.

Figure 5A:
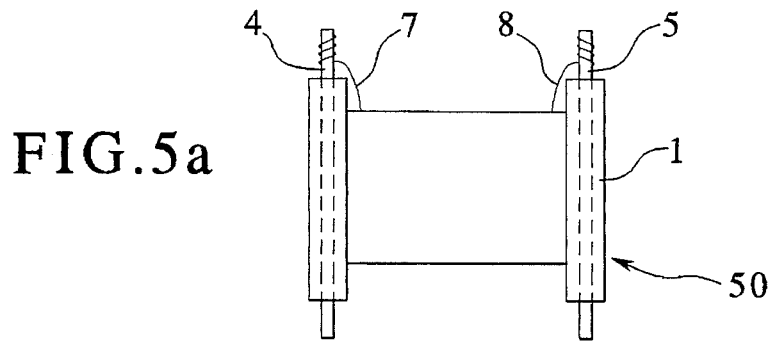
FIG. 5a is an elevated front view of a coil having winding ends wrapped around respective terminal pins.

FIG. 5a again schematically shows a coil member 1 having the terminal pins 4 and 5 having the respectively wrapped winding ends 7 and 8.

Figure 5B:
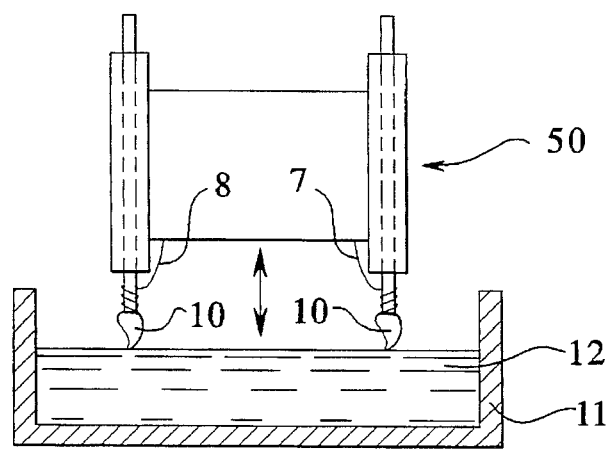
FIG. 5b is an elevated front view of the coil of FIG. 5a positioned above a solder bath after tips of the terminal pins have dipped therein, according to a method of the present invention.

FIG. 5b illustrates a means of supplying the soft solder drop 10 to the terminal pins 4 and 5. As shown, a solder bath 11 is provided for this purpose, a soft solder 12, for example a lead-tin solder, being located therein. This solder 12 is maintained at a temperature only slightly above the melting point of the solder. For example, a Sn—Pb solder having a melting point of 184° C. is held at a temperature of approximately 186° C. in the solder bath 11. The solder 13 has an oxide-free surface at this low temperature and is therefore especially advantageous for soldering without a fluxing agent. The low processing temperature enables constant and long-duration yield, so that practically no solder wastes arise in the bath.

According to FIG. 5b, the coil 50 has the tips of the terminal pins 4 and 5 dipped into the solder 12, as indicated by the arrows. The soft solder 12 therein solidifies against the cooler terminal pins 4, 5, forming the drops 10 thereon.

Figure 5C:
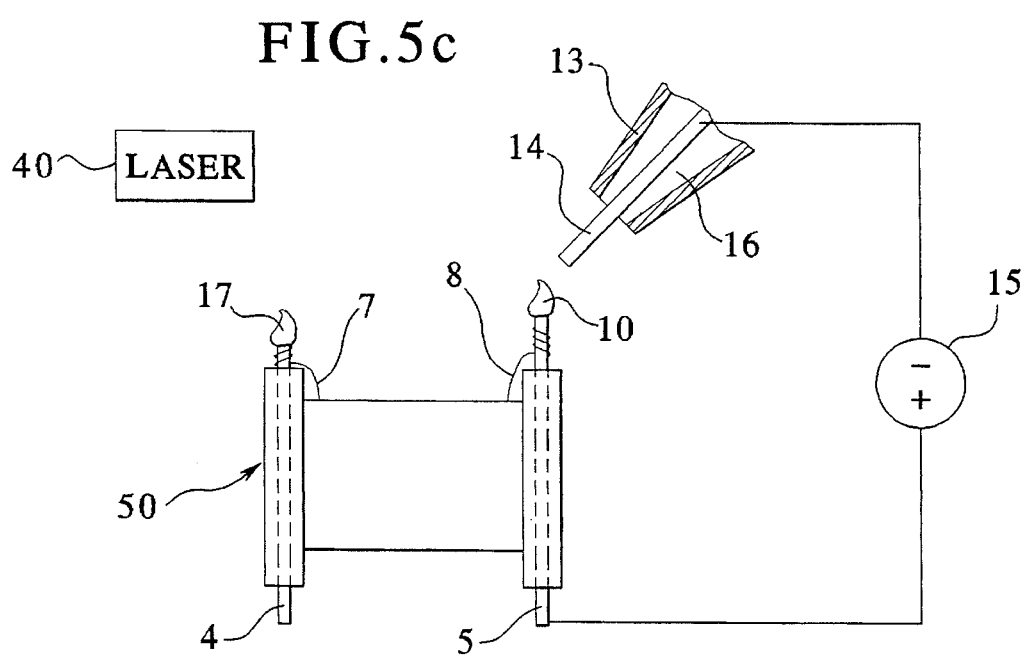
FIG. 5c is an elevated front view of the coil of FIG. 5b, turned over, positioned proximally to a welding apparatus in accordance with a method of the present invention.

In an embodiment, as shown in FIG. 5c, the solder drops 10 are melted with a TIG welding torch 13. The welding torch 13 is used to heat the solder drop 10, terminal pin 5 and the winding end 8 to a temperature. A welding current, for example on the order of magnitude of two amperes or more, is applied between the electrode 14 and the terminal pin 5 in order to ignite an arc having a duration of, for example, 200 msec.

At the same time, a protective gas or protective atmosphere, e.g., argon, is blown onto the solder location via a protective atmosphere nozzle 16. The protective atmosphere prevents scaling and oxidation at the connecting elements despite the relatively high soldering temperatures of the arc. During the operation, the drop 10 flows to form the bulb 17 as shown in FIG. 5c at the terminal pin 4.

The actuation time of the arc can be between 100 and 300 msec for a typical pin 4 where the arc has a power of 2 Amperes. However, depending on materials and thickness, the time and/or power can be selectively adjusted in order to reach the required soldering temperature. As mentioned above, the soldering temperature is usually around 300°–400° C., or the temperature sufficient to melt the solder without damaging the winding ends 7, 8 or terminal pins 4, 5. Preferably, the soldering temperature is lower than the melting point of the winding ends 7, 8 and terminal pins 4, 5.

In another embodiment, a laser 40 can be used as the heat source. The laser 40 directs a laser beam onto the wrapped region to melt the solder at the soldering temperature.

Figure 8:
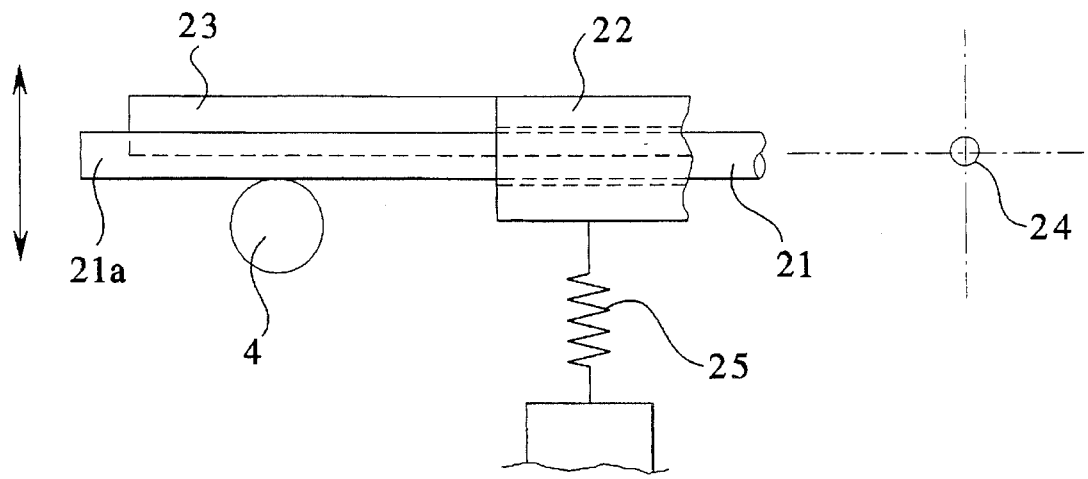
FIG. 8 is a schematic top plan view generally from line VIII—VIII onto the wire delivery mechanism of FIG. 6.

FIGS. 6–8 show another embodiment of the soldering method of the invention. In this embodiment, the solder is supplied in wire form instead of in a bath. As in the preceding exemplary embodiment, the terminal pin 4 has the wrapped winding end 7 positioned proximal to a TIG welding torch 13 and the electrode 14 thereof. In this case, too, a constant current source 15 is connected for generating the welding current. Also, the protective atmosphere 18, such as argon, is blown onto the solder location via a protective atmosphere nozzle 16.

The solder in the embodiment of FIG. 6 is supplied in form of a solder wire 21. More specifically, the solder wire 21 is provided via a guide tube 22 which holds the solder wire 21 concentrically therein. The guide tube 22 includes an extension 23 which projects in an axial direction therefrom. The extension 23 is generally a quarter-section of a tube shape, as shown in FIGS. 7a and 7b. The extension 23 can support an end section 21a of the solder wire 21, a side of which is openly exposed toward the terminal pin 4 and is upwardly exposed toward the heat source.

The guide tube 22 is pivotally mounted to rotate around an axis 24, as illustrated in FIGS. 6 and 8. The guide tube 22 can thereby be rotated to press the end section 21a of the solder wire against the terminal pin 4. A spring 25, as illustrated in FIG. 8, can, for example, be used to bias the guide tube 22 to rotate in this manner. Furthermore, the solder wire 21 is pushed through the guide tube 22 via a feed device 26 which can include a plurality of rollers.

During the soldering process, a respectively specific predetermined length of the solder wire 21 is pushed through the guide tube 22 with the assistance of the feed device 26, so that the solder wire 21 is positioned adjacent to the free end of the terminal pin 4 and can be brought into contact with the pin 4 by the spring 25. Vertical positioning between the terminal pin 4 and the end section 21a can also be adjusted if necessary to be held slightly above the flat zone 9, as illustrated in FIGS. 6 and 7a.

The electrode 14 of the TIG welding torch 13 is also positioned proximal to the terminal pin 4 and generally above the guide tube 22. As illustrated in FIG. 6, the electrode 14 has its end offset somewhat in the direction toward the guide tube 22 relative to an axis of the terminal pin 4, so that an arc 18 is ignited at this side of the terminal pin facing toward the guide tube 22. The solder wire 21 is melted by the arc 18. The end section 21a melts and adheres to the terminal pin 4 where it cools to form the bulb 17, as shown in FIG. 4c.

In order to avoid an adhesion of the remaining solder wire 21 to the terminal pin, the solder wire 21 is pulled back through the feed device 26 during activation of the arc. For example, the on-time of the arc can be approximately 300 msec for a particular thickness of the terminal pin 4. Thus, the solder wire 21 is preferably expediently retracted after approximately 200 msec on-time, whereas the arc continues to burn for approximately 100 msec layer.

Figure 9:
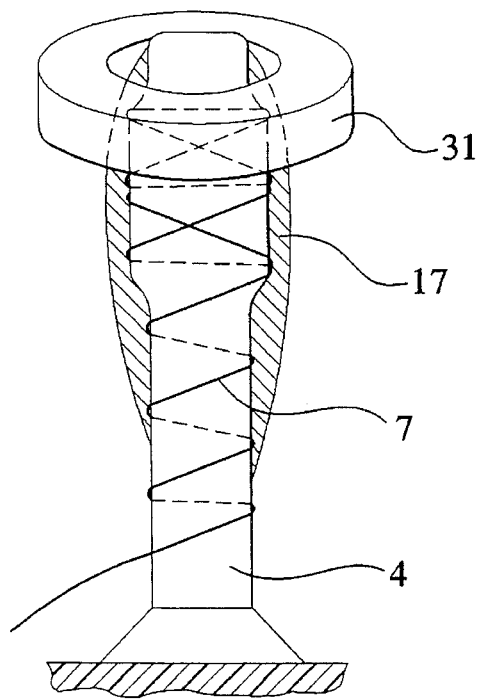
FIG. 9 is an elevated side view of a terminal pin having solder supplied in ring form according to a method of the present invention.

In a further embodiment, FIG. 9 schematically illustrates yet another means of applying a predetermined quantity of solder to the terminal pin 4 wherein the solder is provided in the form of a ring 31. The melting then ensues in the same way as in the preceding examples.

It should be understood that various changes and modifications to the presently preferred embodiments described herein will be apparent to those skilled in the art. Such changes and modifications may be made without departing from the spirit and scope of the present invention and without diminishing its attendant advantages. For example, a laser can be used as the noncontacting or nonconducting heat source in lieu of the welding torch. Also, the method of soldering can be used on a device having more or fewer terminal pins than shown in the Figures. Furthermore, the invention is not limited to use on coils. It is, therefore, intended that such changes and modifications be covered by the appended claims.

What is claimed is:

1. A method for soldering a wire end to a terminal pin, the method comprising the step of:

wrapping the wire end around the terminal pin with a plurality of turns;

providing an amount of solder to the terminal pin, wherein the solder is brought into contact with the terminal pin free of fluxing agents; and applying heat to the terminal pin for melting the solder at a soldering temperature with a noncontacting heat source under a protective atmosphere.

2. The method according to claim 1, wherein the heat source is an arc welder which produces an arc under a protective atmosphere.

3. The method according to claim 2, wherein the arc is activated for a time between 100–300 msec and the welding current is such that the solder is heated to a temperature between 300°–400° C.

4. The method according to claim 1, wherein the step of applying heat includes directing a laser beam from a laser source.

5. The method according to claim 1, further comprising the step of:

crimping the pin to have a non-round cross sectional shape in a wrapping region before the wrapping of the wire end.

6. The method according to claim 1, wherein the providing step includes:

brief immersion of the pin tips into a solder bath, the bath having a temperature slightly above the melting point of the solder; and retracting the pin tips from the bath, the amount of solder adhering thereto in the form of a drop.

7. The method according to claim 1, wherein the providing step includes placing the amount of solder onto the terminal pin in the form of a preshaped ring.

8. The method according to claim 1, wherein the solder is provided in the form of a solder wire, the method further comprising the step of:

contacting an end section of the solder wire into contact with the terminal pin.

9. A method for fluxless soldering of a winding wire to a terminal pin comprising the steps of:

wrapping an end of the winding wire around the pin at a wrapped region;

placing a predetermined amount of solder on the terminal pin adjacent the wrapped region;

heating the wrapped region by a heat source without contact therewith so that the terminal pin reaches a maximum temperature between 300° C. and 400° C.

10. The method according to claim 9 wherein the placing step includes:

providing a solder bath at a temperature slightly above the melting temperature of solder therein;

dipping a tip of the terminal pin into the bath; retracting the tip from the bath so that a drop of the solder is positioned thereon.

11. The method according to claim 9 wherein the placing step includes:

positioning a ring of solder around the terminal pin.

12. The method according to claim 9 wherein the placing step includes:

contacting a length of solder wire against the terminal pin.

13. The method according to claim 12 wherein the placing step also includes:

advancing the length of solder wire through a guide tube; and biasing the guide tube toward the pin so that the length of solder is held in contact thereagainst.

14. The method according to claim 13 further comprising the step of:

retracting the solder wire during the heating step.

15. The method according to claim 9 wherein the heat source is a welding arc and wherein the heating step includes:

activating the welding arc onto the wrapped region for a selected time and selected power setting;

directing a flow of protective gas over the arc.

16. The method according to claim 15 wherein the protective gas is argon.

17. The method according to claim 15 wherein the activating step has a duration between approximately 100 and 300 msec.

18. The method according to claim 19 wherein the heat source is a laser beam and the heating step includes:

directing the laser beam at a selected power onto the wrapped region.

* * * * *